United States Patent

Reaves

[15] 3,637,982
[45] Jan. 25, 1972

[54] APPARATUS FOR HEATING THERMOPLASTIC FRAMES FOR GLASSES

[72] Inventor: John E. Reaves, 1029 Christine Ave., Anniston, Ala. 36201

[22] Filed: July 16, 1970

[21] Appl. No.: 55,390

[52] U.S. Cl.................................219/368, 34/202, 219/221, 219/373
[51] Int. Cl...........................................F24h 3/04
[58] Field of Search..................34/202; 219/221, 359, 364, 219/368, 369, 370, 371, 373, 374

[56] References Cited

UNITED STATES PATENTS

| | | | |
|---|---|---|---|
| 3,378,009 | 4/1968 | Peplin | 34/202 UX |
| 1,557,607 | 10/1925 | Ovington | 219/221 X |
| 3,089,942 | 5/1963 | Wrigglesworth et al. | 219/371 |
| 1,887,233 | 11/1932 | Condos | 219/359 X |
| 1,595,440 | 8/1926 | Winslow | 34/202 |

Primary Examiner—R. F. Staubly
Attorney—Jennings Carter & Thompson

[57] ABSTRACT

Heating apparatus for thermoplastic frame for glasses where heated air is discharged from a housing and directed by an arcuate baffle around specific portion of frame. Air supplied by blower which forces air past heat element in housing.

6 Claims, 2 Drawing Figures

PATENTED JAN 25 1972

3,637,982

INVENTOR.
John E. Reaves
BY
Jennings, Carter & Thompson
Attorneys 3,637,982

APPARATUS FOR HEATING THERMOPLASTIC FRAMES FOR GLASSES

BACKGROUND OF THE INVENTION

This invention relates to apparatus for heating a thermoplastic frame for eye glasses and more particularly to apparatus for heating a specific area of the frame whereby all sides of the specific area are heated uniformly so that the specific area can be stretched or compressed without breakage.

Heretofore in the art to which my invention relates, it has been difficult to stretch or compress certain areas of a thermoplastic frame for eye glasses due to the fact that it has been difficult to concentrate the heat at the specific area and at the same time heat the specific area uniformly on all sides. Where the entire frame is heated, it is not only difficult to handle the frame but areas other than the area to be stretched or compressed are often deformed. While heat has been applied to specific areas of a thermoplastic frame for glasses, the heat has been directed to only one side of the frame whereby that side is heated excessively while the opposite side is not heated, thus resulting in breakage of the frame or uneven stretching or compressing of the heated portion.

BRIEF SUMMARY OF THE INVENTION

In accordance with my invention, I provide apparatus which supplies heated air uniformly around the entire specific area to be heated whereby all sides of the area are heated uniformly without heating other areas of the frame. The heated air is discharged from a housing and directed by an arcuate baffle around the specific portion, such as the nose bridge of a frame.

Figure 2:
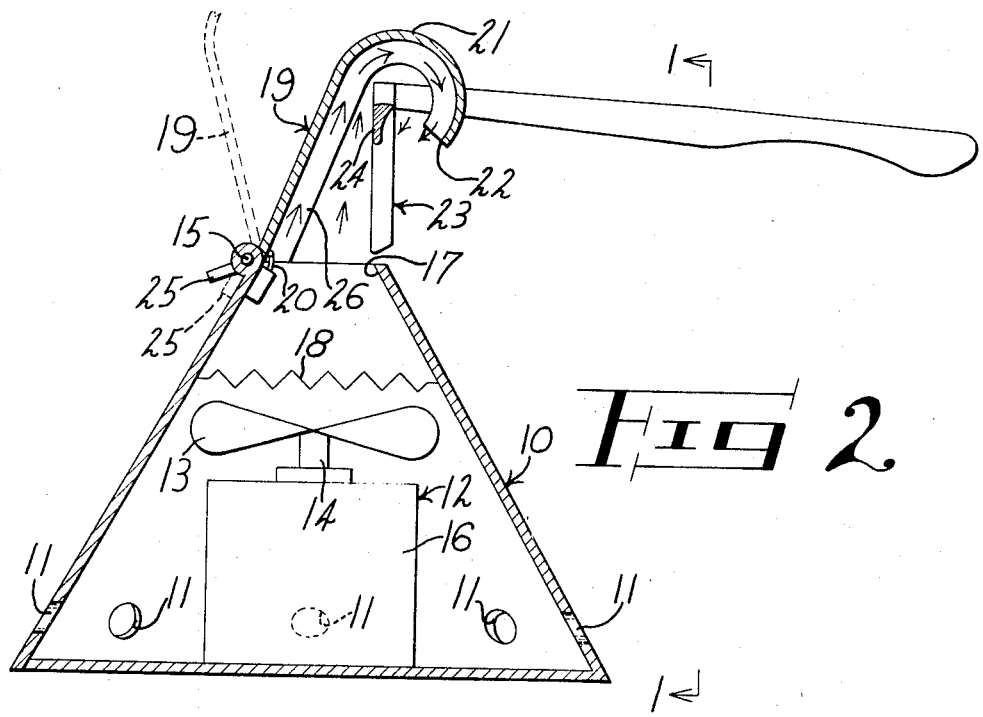
Figure 1:
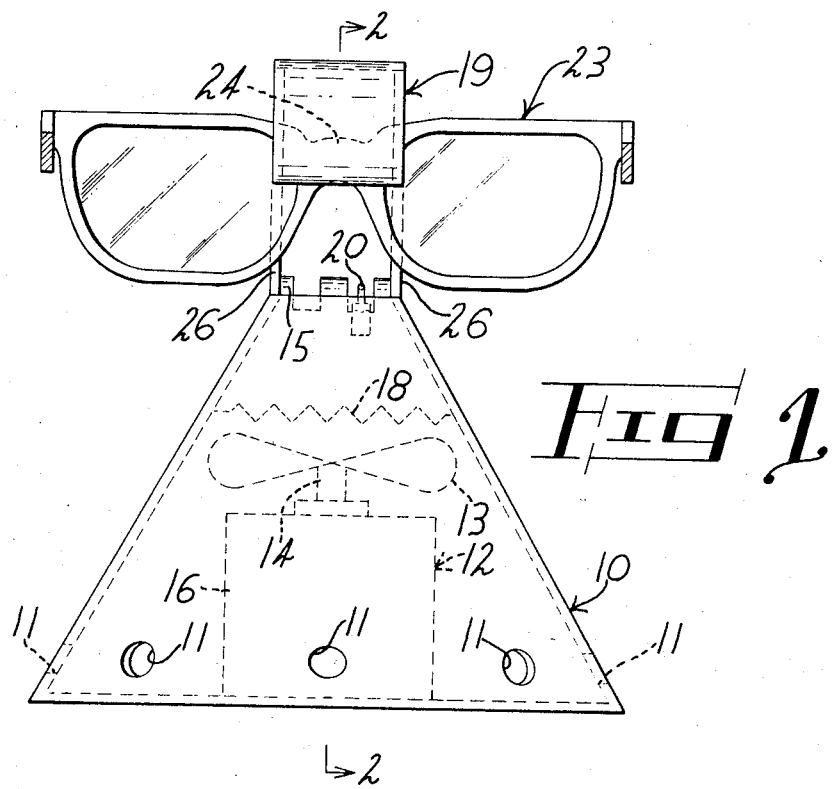

Apparatus embodying features of my invention is illustrated in the accompanying drawing, forming a part of this application, in which:

FIG. 1 is a side elevational view of the apparatus taken along the line 1—1 of FIG. 2 and showing the frame in position for heat to be applied to the nose bridge; and, FIG. 2 is a sectional view taken generally along the line 2—2 of FIG. 1.

Referring now to the drawing for a better understanding of my invention, I show a housing 10 having suitable air supply passageways 11 therein. Mounted within the housing 10 is an air blower 12 which is shown as comprising an impeller blade 13 mounted on a shaft 14 of an electric motor 16. The upper end of the housing 10 is tapered and provided with a discharge passageway 17, as shown in FIG. 2. Mounted within the housing 10 between the impeller blade 13 and the discharge passageway 17 is a heating element 18 which may be in the form of an electric resistance heater element.

Pivotally connected to the housing 10 at one side of the discharge passageway 17 by a hinge unit 15 is a deflector baffle 19 which is curved laterally as at 21 and extends over and in spaced relation to the discharge passageway 17. An electrical switch element 20 is carried by the housing 10 in position to engage the baffle 19 while the baffle is in operative position, as shown in FIG. 2. Upon pivotal movement of the baffle 19 in a counterclockwise direction, as viewed in FIG. 2, to the dotted-line position, the switch element 20 breaks the circuit to the heating element 18 and blower motor 16 so that the heating element 18 and the blower 12 are energized only while the baffle 19 is in the operative position. A suitable stop 25 is carried by baffle 19 in position to engage the housing 10 and thus limit pivotal movement of baffle 19. The deflector baffle 19 terminates at a point which is beyond and in spaced relation to the discharge passageway 17 so as to leave a space 22 between the free end of the deflector baffle 19 and the adjacent side of the discharge passageway 17, as shown in FIG. 2, for receiving a portion of the frame 23 to be heated. In the drawing, the frame 23 is shown as being positioned with the nose bridge 24 inwardly of the deflector baffle 19 whereby the heated air passes in the direction of the arrows shown in FIG. 2 to thus pass around the nose bridge 24.

To restrain lateral movement of the heated air as it passes along the inner surface of the deflector baffle 19, I provide a continuous, inwardly extending flange 26 at each side of the deflector baffle 19. Accordingly, the inwardly extending flanges 26 define with the baffle member 19 a generally channel-shaped inner surface for directing the heated air around the nose bridge 24. While I have shown the deflector baffle as being particularly adapted for heating the nose bridge section of the frame 23, it will be apparent that other specific areas of the thermoplastic frame 23 may be inserted inwardly of the deflector baffle 19 whereby heat may be uniformly applied to all surfaces thereof.

From the foregoing, the operation of my improved apparatus will be readily understood. With the deflector baffle 19 in the dotted-line position shown in FIG. 2, the frame 23 is placed in position for a specific area thereof to be heated. The baffle 19 is then lowered to the solid line position shown in FIG. 2 whereupon the electrical circuit is completed through switch 20 to the heating element 18 and the motor 16 for the blower 12. Upon thus energizing the heat element 18 and the blower 12, air is drawn inwardly through the passageways 11 and heated air is discharged continuously through passageway 17 whereupon it passes in the direction of the arrows adjacent the inner surface of deflector baffle 19. With the baffle 19 thus lowered to the solid line position, the area of the thermoplastic frame 23 to be heated, such as the nose bridge 24, is positioned in the space 22 left between the free end of the baffle 19 and the adjacent upper end of the housing 10. As the air passes around the nose bridge 24, it is uniformly heated on all sides whereby the nose bridge section may be stretched or compressed by exerting force in the proper direction on the frame 23 in a manner well understood in the art to which my invention relates.

From the foregoing, it will be seen that I have devised improved apparatus for heating a thermoplastic frame for eye glasses. By providing means for heating a specific area only of the thermoplastic frame, the areas not to be stretched, compressed or bent are not distorted in any manner. Also, by applying a uniform heat to all surfaces of the specific area to be treated, the frame is not broken and the specific area may be stretched, compressed or bent uniformly without damage to the frame. Furthermore, by providing the inturned flange at each side of the deflector baffle 19, I restrain lateral movement of the heated air as it passes along the inner surface of the deflector baffle thus further concentrating the heat to the specific area of the frame 23 to be heated. Furthermore, by mounting the deflector baffle for pivotal movement whereby the circuit to the heating element and the blower is interrupted each time the baffle is moved to inoperative position, the heating element and blower are energized only while the specific area of the frame to be heated is in place and the baffle is lowered to operative position.

While I have shown my invention in but one form, it will be obvious to those skilled in the art that it is not so limited, but is susceptible of various other changes and modifications without departing from the spirit thereof.

What I claim is:

1. Apparatus for heating a specific area of a thermoplastic frame for glasses comprising:
   a. a housing having an air discharge passageway therein,
   b. a deflector baffle mounted at one end adjacent one side of said discharge passageway and inclined inwardly and laterally thereover with an intermediate portion of said baffle curved laterally over and in spaced relation to said discharge passageway with the other end of said deflector baffle directed toward and terminating beyond and in spaced relation to the other side of said discharge passageway leaving a space therebetween for receiving a specific area of the frame to be heated, and
   c. means delivering heated air to said discharge passageway so that heated air passes adjacent the inner surface of said deflector baffle and all the way around said specific area of the frame to be heated, said deflector baffle being substantially of a width to span the nose bridge of said frame so that the heated air passes substantially around said specific area.

2. Apparatus for heating a specific area of a thermoplastic frame for glasses as defined in claim 1 in which a continuous inwardly extending flange is provided at each side of said deflector baffle in position to restrain lateral movement of the heated air as it passes adjacent the inner surface of said baffle.

3. Apparatus for heating a specific area of a thermoplastic frame for glasses as defined in claim 1 in which said housing is provided with a tapered portion which terminates in said discharge passageway.

4. Apparatus for heating a specific area of a thermoplastic frame for glasses as defined in claim 1 in which the means delivering heated air comprises:

a. a blower mounted in said housing, and
b. a heating element mounted between said blower and said discharge passageway.

5. Apparatus for heating a specific area of a thermoplastic frame as defined in claim 1 in which said deflector baffle is pivotally connected to said housing adjacent one side of said discharge passageway.

6. Apparatus for heating a specific area of a thermoplastic frame as defined in claim 5 in which an electrical switch element is operatively connected to said deflector baffle and to said means delivering heated air and is operable to interrupt the supply of heated air upon movement of said deflector baffle to inoperative position.

* * * * *